Patented Oct. 5, 1954

2,690,627

UNITED STATES PATENT OFFICE 2,690,627

METHOD OF COMBATING AND PREVENTING OCCURRENCE OF VIRUS DISEASES IN PLANTS

Viking Lennart Nyman, Marudd, Gronbacka, Helsingfors, Finland

No Drawing. Application September 19, 1949, Serial No. 116,609

Claims priority, application Finland October 8, 1948

5 Claims. (Cl. 47—57.5)

As known it is difficult to combat virus diseases. Often there is nothing else to do but completely destroy, for instance by burning, all the afflicted specimens.

Now the surprizing discovery has been made that virus diseases in plants can be successfully combated resp. prevented by treating the plants with ethyl alcohol and crotonaldehyde.

According to an embodiment of the invention ethyl alcohol and crotonaldehyde is applied to the roots of the plants.

According to another embodiment ethyl alcohol and crotonaldehyde is injected into the stem of the plant.

According to another embodiment the plants are sprayed with ethyl alcohol and crotonaldehyde.

According to another embodiment of the invention the plants to be treated are subjected to the action of air containing vaporous ethyl alcohol and crotonaldehyde.

Further it has been discovered that ethyl alcohol has in certain instances better effect if it contains croton aldehyde.

According to another embodiment of the invention the plants to be treated are subjected to the action of air containing ethyl alcohol and croton aldehyde as vapors or aerosols.

For describing the invention more particularly some embodiments will hereinafter be given as examples.

Example 1

In the month of June a comparative test series was carried out with tomato plants badly afflicted with streak virus. The plants were divided into four groups.

The plants of the first group were wetted with a mixture containing equal parts by volume of 94 per cent ethyl alcohol and water. An amount of 80 ml. of the mixture was applied to the roots of each plant. After about 4 weeks the plants were quite well and normal. A single treatment had this effect. A part of the plants of the first group was wetted with 150 ml. of a mixture containing equal parts of 94 per cent ethyl alcohol and water. This amount first caused chlorosis in the plants. After about 4 weeks even these plants were quite well.

The plants of the second group were treated with 94 per cent ethyl alcohol by injecting 2 ml. of ethyl alcohol into the stem of each plant. After three weeks the plants were 100 per cent sound and normal. A single treatment had this effect.

The plants of the third group were treated with 94 per cent ethyl alcohol by injecting 2 ml. of ethyl alcohol into the root of each plant. After three weeks the plants showed marked improvement.

The plants of the fourth group were treated by spraying with 94 per cent ethyl alcohol. A distinct change for the better was observed.

Example 2

In the month of April three tomato plants with leaf roll virus were treated by injecting 2 ml. of 94 per cent ethyl alcohol into the stem of each plant. After three weeks the plants were well and normal.

Example 3

In a hothouse the tomato plants were badly afflicted with the tomato aucuba virus disease. The plants were treated by injecting 94 per cent ethyl alcohol containing 6 per cent croton aldehyde. Into each plant 2 ml. were injected. After three weeks all the plants were well.

Example 4

A comparative test series was carried out with tomato plants badly afflicted with streak virus. The plants were divided into 4 groups.

The plants of the first group were wetted with a mixture containing 50 parts by volume of ethyl alcohol with 6 per cent water and 6 per cent croton aldehyde and 50 parts by volume of water (about 3% croton aldehyde). An amount of 80 ml. of the mixture was applied to the roots of each plant. After about 3 weeks the plants were quite well and normal. A single treatment gave this result.

The plants of the second group were treated with ethyl alcohol containing 6 per cent water and 6 per cent croton aldehyde by injecting 2 ml. of the mixture into the stem of each plant. After 2 weeks the plants were 100 per cent sound and normal.

The plants of the third group were treated with ethyl alcohol containing 6 per cent water and 6 per cent croton aldehyde by injecting 2 ml. of the mixture into the root of the plant. After 2 weeks the plants were 100 per cent well and normal. The plants of the fourth group were treated by spraying with ethyl alcohol containing 6 per cent water and 6 per cent croton aldehyde. A distinct change for the better was observed.

Example 5

In a hothouse with tomato plants afflicted in part with the tomato aucuba virus disease ethyl alcohol containing 6 per cent water and 6 per cent croton aldehyde was spread out into the air, the said substances appeared in the air partly as vapor and partly as mist. The disease was prevented from infecting sound plants. In diseased plants a marked change for the better was observed.

*Example 6*

In a hothouse approximately a fourth of the tomato plants were afflicted with the tomato aucuba virus disease while three fourths of the plants at least to outward appearance were well. The diseased plants were treated by injecting 2 ml. of 94 per cent ethyl alcohol into the stems of the plants. The sound plants in danger of being infected with the disease were treated with prophylactic intention by applying to their roots 80 ml. of a mixture containing 50 parts by volume 94 per cent ethyl alcohol and 50 parts by volume water. After three weeks the hothouse was free of the disease.

Obviously various modifications can be made in the method described in the examples hereinabove given without departing from the scope and spirit of the invention. Consequently it is possible to vary the concentration of the medium employed within limits depending on what concentration each time produces the best results. The treatment can also be repeated at intervals of 5 to 6 days should not the first treatment produce the desired effect.

I claim:

1. Method of combating plant virus diseases and preventing the occurrence thereof in plants comprising treating the plants with protein free ethyl alcohol containing from about 3% to about 6% of croton aldehyde.

2. Method of combating plant virus diseases and preventing the occurrence thereof in plants comprising applying protein free ethyl alcohol containing from about 3% to about 6% of croton aldehyde to the roots of the plants.

3. Method of combating plant virus diseases and preventing the occurrence thereof in plants, comprising injecting protein free ethyl alcohol containing from about 3% to about 6% of croton aldehyde into the stem of the plant.

4. Method of combating plant virus diseases and preventing the occurrence thereof in plants comprising spraying the plants with protein free ethyl alcohol containing from about 3% to about 6% of croton aldehyde.

5. Method of combating plant virus diseases of the tomato aucuba, leaf roll and streak virus type and preventing the occurrence thereof in plants comprising subjecting the plants to the action of air containing protein free ethyl alcohol and from about 3% to about 6% of croton aldehyde in the form of vapor and mist.

References Cited in the file of this patent

FOREIGN PATENTS

| Number | Country | Date |
|---|---|---|
| 137,149 | Switzerland | Mar. 1, 1930 |

OTHER REFERENCES

Chem. Abstracts, vol. 32, Col. 91644—Abstract of article by Ingersoll et al. in Food Research, 3, 389-392 (1938).

Cupples et al., J. Econ. Ent., vol. 29, No. 3, June 1936, pgs. 611-618 (see pg. 615).

McCulloch, "Disinfection and Sterilization" 1936, Lea & Febiger, Philadelphia, pgs. 365-369.